May 5, 1964

D. H. REED 3,131,964

FOLDING SEAT ARRANGEMENT

Filed Nov. 13, 1962

INVENTOR.
DONALD H. REED
BY
Douglas R. McKechnie
ATTORNEY

May 5, 1964  D. H. REED  3,131,964
FOLDING SEAT ARRANGEMENT
Filed Nov. 13, 1962  2 Sheets-Sheet 2
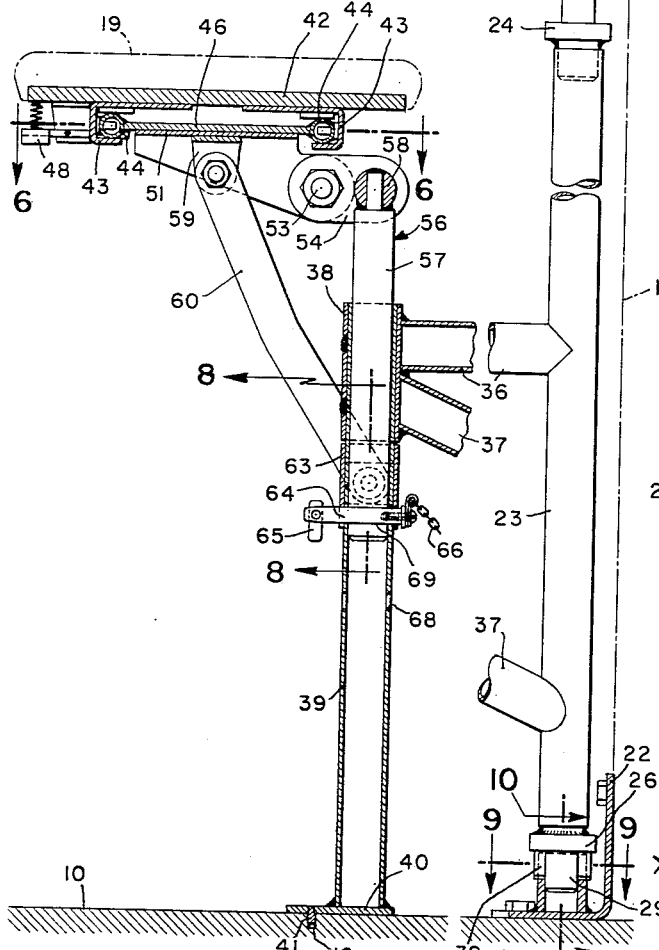
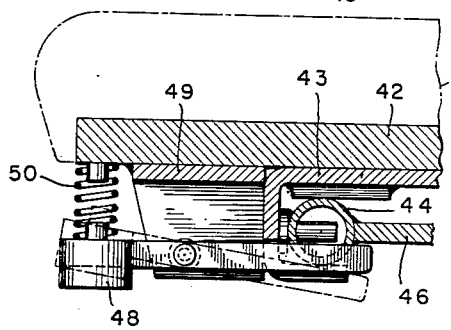
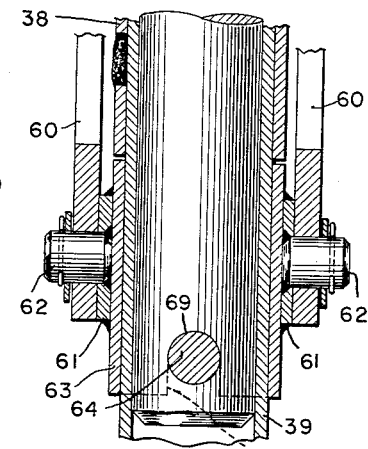
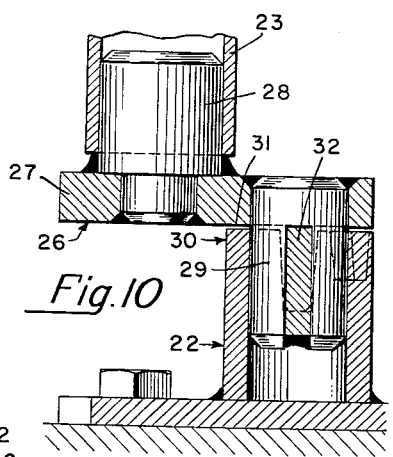
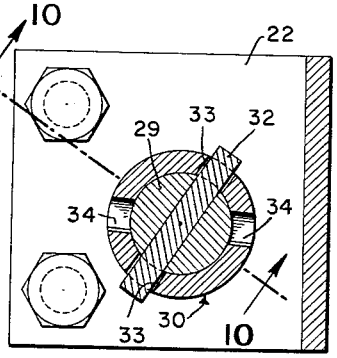
INVENTOR.
DONALD H. REED
BY
Douglas R. McKechnie
ATTORNEY

United States Patent Office 3,131,964
Patented May 5, 1964

3,131,964
FOLDING SEAT ARRANGEMENT
Donald H. Reed, Levittown, Pa., assignor to The Budd Company, Philadelphia, Pa., a corporation of Pennsylvania
Filed Nov. 13, 1962, Ser. No. 237,055
4 Claims. (Cl. 297—13)

This invention relates to a folding seat arrangement of a type which is particularly, although not exclusively, applicable as a motorman's or operator's seat in a rapid transit or subway car.

One of the objects of the invention is to provide a novel operator's seat for use in a novel arrangement in the motorman's cab of a self-propelled, rapid transit car.

Another object is to provide a novel folding seat arrangement wherein the seat can be stored so as to permit the space occupied by the seat when in use to be used for other purposes without interference by the stored seat.

Still another object is to provide a storable seat with improved means for locking the seat in a stowed position and in an operative position wherein the seat is ready for use.

Other objects and advantages of the invention will be apparent from the following description taken in connection with the accompanying drawings wherein:

FIG. 5 is a vertical sectional view, with portions removed, along lines 5—5 of FIG. 2;

FIG. 7 is a vertical sectional view along lines 7—7 of FIG. 6; and

Figure 3:
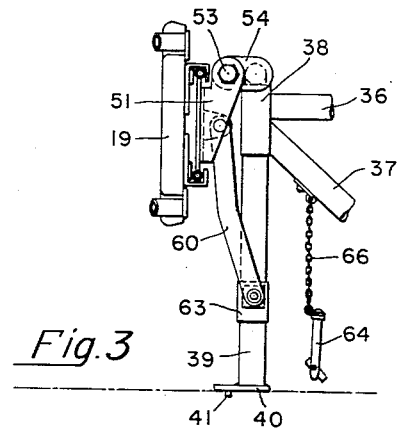
FIG. 3 is a view, with portions removed, similar to FIG. 1 but showing the seat cushion in a folded position and the support frame in an operative position.

FIGS. 8, 9 and 10 are sectional views along lines 8—8, 9—9 and 10—10 of FIG. 5, FIG. 10 being also along lines 10—10 of FIG. 9, FIGS. 7–10 being enlarged relative to the scales of the other views, for clarity of illustration.

Referring now to the drawings, the invention is illustrated as applied to a motorman's cab including a cab floor 10, a vertical corner post 11 at one corner of the cab, a cab end sheet 12 extending around the front and one side of the cab, and an equipment shelf 14 extending transversely of the cab from the corner post. The cab is constructed in a conventional fashion and is adapted to contain a plurality of controls (not shown) at a control station which, when not in use, is adapted to be closed by a vestibule end door 15. A hole 16 is provided in the cab floor 10 at a point spaced diagonally from the corner post, the hole being for a purpose described hereafter.

Figure 1:
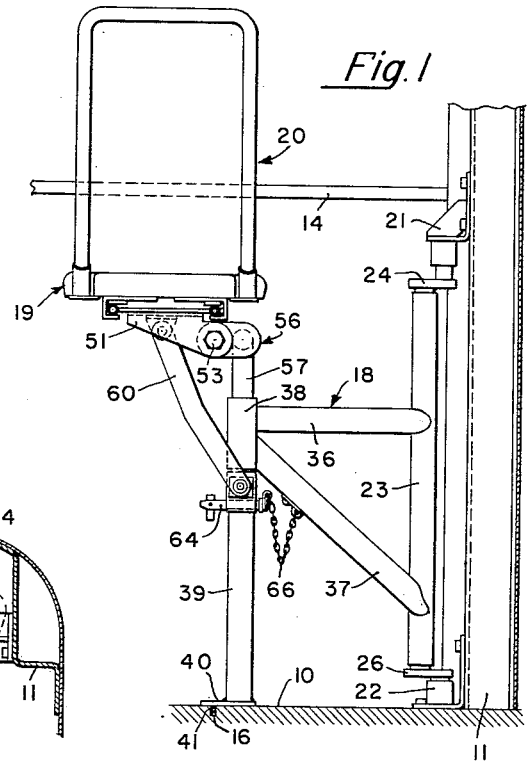
FIG. 1 is an elevational view of a motorman's cab embodying the invention, the view looking towards the front of the cab.
Figure 4:
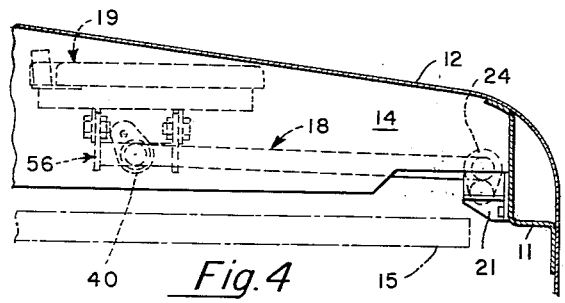
FIG. 4 is a top plan view, similar to FIG. 2, illustrating the operator's seat, in a stowed position, towards the front of the motorman's cab.
Figure 6:
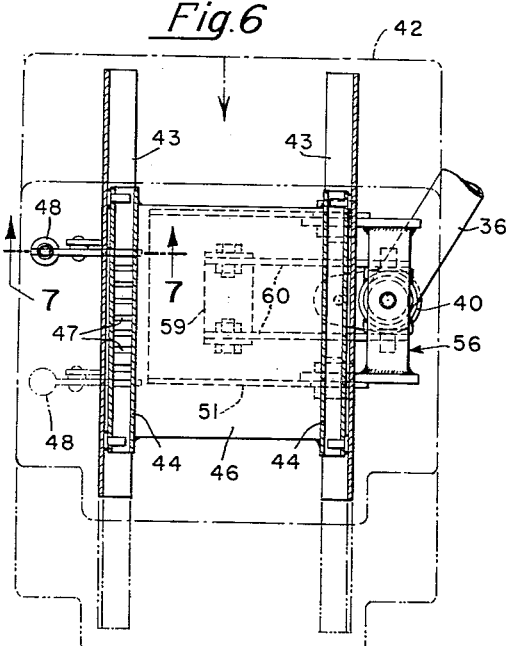
FIG. 6 is a horizontal sectional view along lines 6—6 of FIG. 5.

Disposed in the cab is an operator's seat comprising a support frame 18, a seat cushion 19 mounted on the support frame, and a removable backrest 20 (FIGS. 1 and 2) adapted to be mounted on the seat cushion when the seat cushion is in its operative position, i.e., its position of intended use. The support frame 18 is movable between an operative position (FIGS. 1–3 and 5) and a stowed position (FIG. 4) while the seat cushion is movable relative to the support frame between an operative position (FIGS. 1, 2, 5 and 6) and a folded position (FIGS. 3 and 4).

Support frame 18 is mounted for rotative swinging movement about a vertical axis located adjacent to the corner post 11, by means of a pair of vertically-spaced mounting brackets 21 and 22 connected to corner post 11, the lower bracket 22 being also bolted to floor 10. Support frame 18 has a vertical member comprising a pivot tube 23 connected at opposite ends to a pair of vertically-spaced pivot brackets 24 and 26. As best seen in FIGS. 5, 9 and 10, each of pivot brackets 24 and 26 includes a pivot support plate 27 having welded thereto a tube pin 28 and a pivot pin 29. Tube pins 28 are welded to and extend into opposite ends of pivot tube 23 and have their axes in alignment with the axis of the tube whereas pivot pins 29 are axially aligned along the axis of swinging movement of support frame 18. To accommodate pivot pins 29, mounting brackets 21 and 22 include a pair of pivot tubes 30 which rotatably receive pivot pins 29. Pivot brackets 24 and 26 offset the axis of tube 23 from the axis of rotation of the support frame so that the support frame is stowed substantially wholly in front of the axis of rotation thereof as best seen in FIG. 4.

Pivot tube 30 of bracket 22 has an upper edge 31 which acts as a bearing, during swinging movement of the support frame between positions, to support a lock plate 32 integral with lower pivot pin 29. Lock plate 32 has a length greater than the diameters of pivot pin 29 and pivot tube 30 so that its ends project beyond the outside of the pivot tube. Pivot tube 30 also includes two pairs of diametrically opposed notches 33 and 34 which are angularly spaced from each other, the notches 33 being in angular alignment with the operative position of the support frame and notches 34 being in angular alignment with the stowed position of the support frame. When the support frame is in either of these positions, lock plate 32 is received in the appropriate notches to prevent rotation of the support frame from such position.

The distance the upper edge of pivot tube 30 of bracket 22 and the lower edge of pivot tube 30 of bracket 21 is greater than the distance between the pivot support plates of pivot brackets 24 and 26 so that when the lock plate is engaged in either of the notches, the support frame can be raised vertically a sufficient distance to disengage the lock plate from the notches and permit rotation of the support frame. However, the distance between adjacent edges of pivot tubes 30 is less than the length of the vertical member so that pivot pins 29 are retained in the pivot tubes 30.

Support frame 18 also includes a lower diagonal tube 37 and an upper, horizontal tube 36 which are connected at opposite ends to pivot tube 23 and to swivel tube 38 that is in the form of a sleeve fitted over and affixed to the upper end of a vertical support tube 39. The lower end of support tube 39 includes a horizontal foot pad 40 and an anchor pin 41 that extends downwardly from the bottom surface of the foot pad and is at the same distance from the axis of rotation as hole 16. This hole is also in angular alignment with notches 33 so that when the support frame is in its operative position, anchor pin 41 extends downwardly into hole 16 whereby foot pad 40 rests directly on the upper surface of floor 10 and anchor pin 41 aids in preventing rotation of the support frame.

Hole 16 and anchor pin 41 are provided to strengthen the support frame when in its operative position. In the absence of these elements, ordinary manufacturing tolerances and clearances between lock plate 32 and notches 33 would permit the support frame to wobble whereby the operative position thereof would not be accurately defined. Furthermore, the anchor pin and hole prevent any torque which might tend to rotate the support frame from its operative position from being magnified through the effective lever system to impart extremely high stresses to the lock plate 32 and notches 33.

As can be best seen in FIG. 10, notches 33 are deeper than notches 34 so that when the support frame is in its operative position, the foot pad 40 engages the upper surface of floor 10 and when the support frame is in the stowed position, the bottom of anchor pin 41 abuts the upper surface of the floor. Thus, the difference in depths between notches 33 and 34 is the same as the length of that portion of anchor pin 41 which projects downwardly from the undersurface of foot pad 40. When lock plate 32 rests on bearing 31, the anchor pin is held above the floor to allow free movement of the support frame.

Seat cushion 19 includes a cushion board 42 attached to a pair of laterally spaced, longitudinally extending tracks 43 that engage a pair of slide tubes 44 welded to opposite edges of a support plate 46. As viewed in FIGS. 5–7, the left tube 44 is provided with a series of evenly spaced slots 47 that are selectively engagable with a manually operated, spring biased lever 48 to allow the seat cushion to be adjusted longitudinally of the cab within the limits (illustrated by the dot-dash lines in FIG. 6) defined by the notches and the extent of travel of the tubes in tracks 43. Lever 48 is pivotally mounted on a bracket 49 secured to the undersurface of cushion board 42 and is biased towards engagement with the slots 47 by a helical compression spring 50.

Support plate 46 is affixed to the top of a cushion support bracket 51 having a pair of downwardly extending flanges 52 that are pivotally connected by pivot pins 53 to the end plates 54 of a support bar assembly 56. Support bar assembly 56 includes a vertical bar 57 and a horizontal bar 58 affixed at its middle to the upper end of bar 57. Bars 57 and 58 are T-shaped and end plates 54 are affixed to opposite ends of bar 58. The lower end of bar 57 extends into the upper end of support tube 39 and is rotatable and slidable relative thereto.

An inverted U-shaped bracket 59 is attached under cushion support bracket 51 and is pivotally connected to a pair of laterally spaced cushion support bars 60 having their lower ends pivotally connected to a pair of brackets 61 via a pair of pivot pins 62 welded to brackets 61. Support bars 60 are retained on pins 62 in any suitable fashion, as by a retaining ring and washer combination. Brackets 61 are attached to diametrically opposed sides of a sleeve 63 whereby the axes of pivot pins 62 extend along a diameter of the sleeve. Sleeve 63 fits around tube 39 and is located beneath swivel tube 38, the sleeve being both rotatable and vertically slidable relative to tube 39.

A lock pin assembly 64, which includes a pivoted lock plate 65 at one end, is connected at its other end to a chain 66 attached to diagonal tube 37 so that the lock pin assembly cannot be removed from the operator's seat. The lower end of bar 57 is provided with a diametrically extending bore 69 and the lower end of sleeve 63 is provided with a pair of diametrically opposed downwardly opening notches 67. Tube 39 is provided with a series of diametrically aligned, vertically spaced holes 68. In the arrangement illustrated there are two pairs of such holes to provide for two different vertical positions of the seat although it is to be understood that more holes can be provided to allow for greater adjustment. When bore 69, notches 67 and holes 68 are aligned, lock pin assembly 64 can be inserted therethrough upon pivoting lock plate 65 into alignment with the holes.

When the operator's seat is in its stowed position, as viewed in FIG. 4, support frame 18 extends transversely of the cab and seat cushion 19 is vertical and is in front of the support frame 18. In such position, the support frame and seat cushion underlie equipment shelf 14 and are out of the way so that vestibule and door 15 can be closed over the control station. In the stowed position, lock plate 32 is engaged in notches 34 to prevent rotation from this position.

In order to move the operator's seat to its operative position, assuming the vestibule door 15 to be open, the support frame 18 is raised upwardly to disengage lock plate 32 from grooves 34 whereupon the support frame 18 can be pivoted from its stowed position to its operative position wherein anchor pin 41 enters into hole 16 as lock plate 32 drops into notches 33.

Next, seat cushion 19 is manually grasped and is pivoted from its vertical position to a horizontal position. The seat cushion is also rotated relative to support tube 39 until notches 67, and bore 69 are aligned with the desired pair of holes 68 whereupon lock pin assembly 64 is inserted to lock seat in its operative horizontal position. Next, the removable backrest 20 is attached to the seat cushion and the seat cushion then adjusted to the desired longitudinal position.

In order to move the seat from its operative position into its inoperative position, a procedure substantially the reverse of the above is employed. Thus, backrest 20 and lock pin assembly 64 are removed permitting the seat cushion to be lowered into its folded position illustrated in FIG. 3, the seat cushion is rotated slightly relative to tube 39 so that it will occupy the desired stowed position, support frame 18 is raised to disengage lock plate 32 from notches 33 and the assembly is then rotated until lock plate 32 falls into notches 34 at the stowed position of the assembly.

Figure 2:
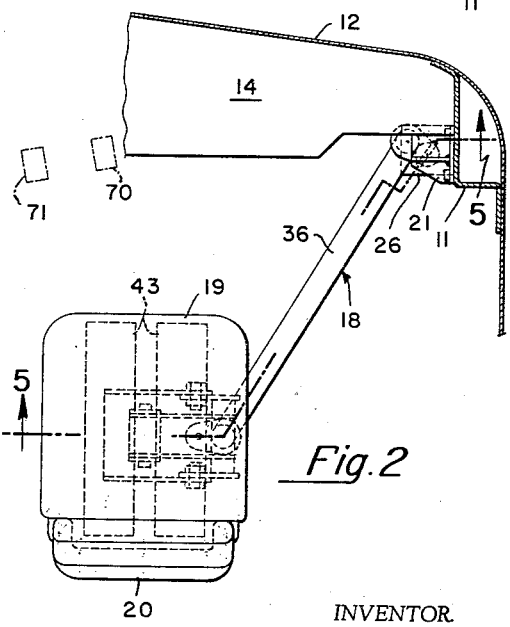
FIG. 2 is a top plan view, partly in section, of the arrangement illustrated in FIG. 1.

As can be best understood with reference to FIG. 2, when the seat cushion 19 is in its operative position, it is spaced rearwardly of shelf 14. Support frame 18 extends diagonally from the corner post 11 into the cab and support tube 39 underlies the middle section of the outboard edge of the seat cushion so that the operator does not have to straddle the support frame. Instead, the operator's legs extend freely in front of seat cushion 19 to allow operation of foot pedals, such as a deadman's valve 70 and an acknowledging switch 71. The arrangement is further advantageous to the operator since it allows the use of both legs on the deadman's valve 70 without frame 18 interfering in any way with the free use of the operator's legs, as would be the case if the support frame extended directly in front of the seat cushion.

While only a single embodiment has been illustrated, it will be apparent to those skilled in the art that many changes can be made in the details and arrangement of parts without departing from the scope of the invention as defined in the appended claims.

What is claimed is:

1. In an operator's seat for use in a motorman's cab having a corner post and an equipment shelf, the combination of: mounting bracket means adapted to be connected to the corner post; a vertical support frame mounted on said bracket means for swinging movement about a vertical axis located adjacent to said corner post between an operative position wherein said frame extends diagonally into the cab and a stowed position wherein said frame extends beneath the equipment shelf; said support frame including a vertical member spaced from said vertical axis and having a tubular upper end and a footpad on its lower end adapted to rest on the cab floor when said support frame is in said operative position; a seat cushion disposed above said vertical member; and means mounting said seat cushion on said support frame for movement therewith between said positions and allowing movement of said seat cushion relative to said support frame, when said support frame is in said operative position, between a horizontal operative position and a vertical folded position permitting stowage beneath the equipment shelf; said seat cushion mounting means comprising a support member telesocpically and rotatably received in the upper end of said vertical member, a cushion support bracket pivotally mounted on said support member, a collar slidably and rotatably mounted on said vertical member beneath the top thereof, cushion support bar means extending between said collar and said cushion support bracket, and means for holding said collar in its seat supporting position.

2. An operator's seat in accordance with claim 1 wherein said collar, said vertical member, and said support member include alignable apertures, and said last-mentioned means comprises lockpin means adapted to extend through said apertures and lock said seat cushion in its operative position.

3. In an operator's seat for use in a motorman's cab, the combination of: a support frame; means adapted to mount said support frame in the cab for movement between a stowed position and an operative position; a seat cushion; and first means mounting said seat cushion on said support frame for movement therewith between said positions, said seat cushion mounting means allowing movement of said seat cushion relative to said support frame between a horizontal operative position and a folded position when said support frame is in said operative position; said first means comprising a vertical support member slidably and rotatably mounted on said support frame, and a collar slidably and rotatably mounted on said support frame; said first means further including second means pivotally connecting said seat cushion to said support member and third means pivotally connecting said seat cushion to said collar, for rotary movement together yet allowing independent vertical movement of said collar and said support member so that said seat cushion can be moved between its operative and folded position; said first means further including releasable means for holding said collar and said support member to support said seat cushion in said operative position.

4. An operator's seat in accordance with claim 3 wherein said support frame comprises a plurality of vertically spaced apertures, and said collar and said support member have aperture means alignable therewith; and said releasable means comprises a lock pin insertable into said aperture means when they are aligned.

References Cited in the file of this patent

UNITED STATES PATENTS

| | | |
|---|---|---|
| 719,625 | Throm | Feb. 3, 1903 |
| 954,857 | Fawcett | Apr. 12, 1910 |
| 1,271,170 | Jelinek et al. | July 2, 1918 |
| 1,347,594 | Salinger | July 27, 1920 |
| 1,944,765 | Sheldon | Jan. 23, 1934 |
| 2,242,138 | Muma | May 13, 1941 |
| 2,567,595 | Bryant | Sept. 11, 1951 |

FOREIGN PATENTS

| | | |
|---|---|---|
| 370,963 | France | Jan. 8, 1907 |
| 503,969 | Great Britain | Apr. 18, 1939 |